United States Patent [19]
Sugimoto et al.

[11] 3,804,715
[45] Apr. 16, 1974

[54] PROCESS FOR PREPARING SUGAR CONTAINING MALTOSE OF HIGH PURITY

[75] Inventors: Kaname Sugimoto; Mamoru Hirao, both of Okayama, Japan

[73] Assignee: Hayashibara Company, Okayama, Japan

[22] Filed: Apr. 8, 1970

[21] Appl. No.: 26,552

[30] Foreign Application Priority Data
Apr. 9, 1969  Japan.................... 44-27543

[52] U.S. Cl................................. 195/31 R, 99/141
[51] Int. Cl.................................... C13d 1/00
[58] Field of Search............. 195/31, 7; 99/141, 142

[56] References Cited
UNITED STATES PATENTS
3,565,765  2/1971  Heady.................................. 195/31
FOREIGN PATENTS OR APPLICATIONS
1,569,499  5/1969  France

OTHER PUBLICATIONS

Sakano et al., Agr. Biol. Chem.; "Specificity of Yeast Isoamylase," Vol. 33, p. 1535–1540, 1969.

Ueda et al., App. Micro., Vol. 15, p. 492–496, 1967.

Primary Examiner—A. Louis Monacell
Assistant Examiner—Thomas G. Wiseman
Attorney, Agent, or Firm—Browdy and Neimark

[57] ABSTRACT

The present invention relates to a process for preparing sugar containing maltose of high purity from starches. More particularly, the invention relates to a process for preparing syrup having a high maltose content or pure maltose by using a β-amylase enzyme which is a maltose-producing enzyme together with various α-1,6-glucosidases to increase maltose content to higher than 50 percent.

12 Claims, 1 Drawing Figure

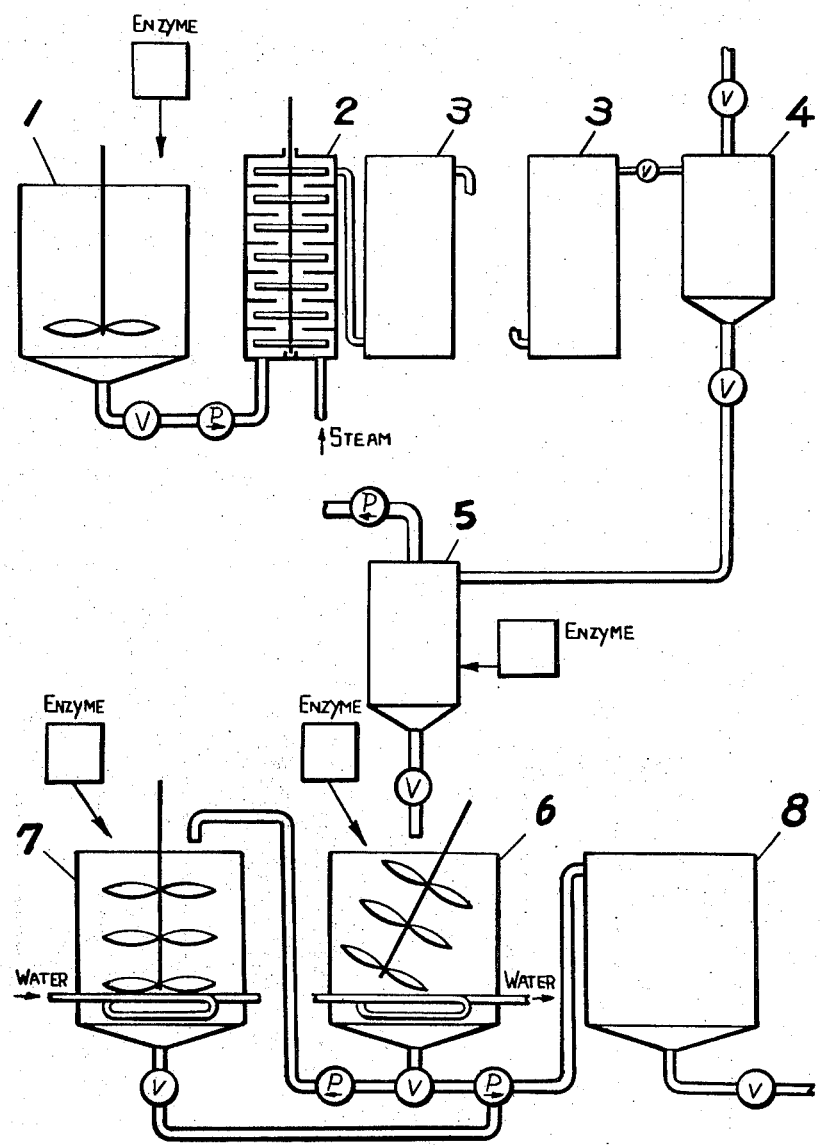

PROCESS FOR PREPARING SUGAR CONTAINING MALTOSE OF HIGH PURITY

The present invention relates to a process for preparing sugar containing maltose of high purity from starches. More particularly, the invention relates to a process for preparing syrup having a high maltose content or pure maltose by using a β-amylase enzyme which is a maltose-producing enzyme together with various α-1,6-glucosidases to increase maltose content to higher than 50 percent.

Maltose-containing saccharoses have been known as malt syrup. They have been prepared by liquefying and saccharifying starches with malt amylase from germinating barley or by adding α-amylase into starch slurry, heating the mixture to effect liquefaction and adding malt amylase into the mixture to effect saccharification. The products thus obtained contain various impurities and high molecular dextrins, and their maltose content is around 50 percent. Therefore, the amount of consumption in the confectionery industry has been small, even though they have been in demand because of their favorable non-hygroscopic properties and stability. Recently, an economical method of extracting pure β-amylase from a wheat bran has been developed and a similar enzyme has been available commercially. Colorless, pure malt syrup has been also prepared recently and the amount of its consumption will soon be the majority of common starch syrup, but the maltose content thereof is poor. Under the circumstances as indicated above, a starch syrup having a high maltose content or pure maltose is needed.

The inventors have succeeded before in the extraction of pure β-amylase from a wheat bran, and at this time investigated the preparation of sugars having a high maltose content with the aid of this pure β-amylase and various α-1,6-glucosidases which have been recently developed.

Maltose obtained from starch (even in an extremely dilute solution or even in the presence of a large quantity of β-amylase) is in a quantity of approximately 65 percent, and the maltose content of the products obtained on a commercial scale is up to about 65 percent. This is due to the known specificity of β-amylase, that it is capable of decomposing straight chain of starch into maltose but incapable of reacting on the α-1,6-glucoside bond in a branched chain in the branched structure. Thus, action of β-amylase is limited. The inventors investigated α-1,6-glucosidase which facilitates the β-amylase action by destroying the α-1,6-glucoside bond in starch. This enzyme is known as isoamylase of yeast or R-enzyme of higher plants. Recently, Pullulanase obtained from Aerobacter aerogenes was reported in Biochem. Z. 334 79 (1961) and contributed to the studies on starch molecule structures. Though those enzymes have various substrate specificities, they, in common, hydrolyze the α-1,6-glucoside bond of starch. They have defects such as low heat resistance, etc. After the wide search of such enzymes, the inventors have found the new strain, Pseudomonus amyloderamosa ATCC 21262 and Escherichia intermedia ATCC 21073, and further industrially important, heat resistant ray fungi such as Streptomyces diastochronoges IFO 3337 and other four genera and Lactobacillus plantarum. The inventors have discovered more than ten industrially utilizable strains (all of them are explained in the Examples given below). The inventors have also obtained β-amylase of a high purity from wheat bran. The inventors have investigated the industrial uses of those enzymes and this has resulted in the present invention.

The inventors have developed a new process in which the novel heat resistant enzymes as above are used. By using β-amylase together with a known polymixa enzyme, a process for the mass production of sugars having any desired maltose content ranging from 50 percent maltose to pure maltose has been completed.

The present invention is to provide a process for preparing pure maltose at a low cost, which has been previously been highly expensive. According to the present invention, it is possible to produce liquid sugars and powdery solid syrups of various maltose contents, and the contributions of this invention to the food industry are great as regards their non-crystallinity, non-hygroscopic properties, chemical stability, proper sweetness and taste.

The procedures of the preparation will be described below. Any starch from subastral or subterranean source is utilizable. Available substral starches are corn starch, waxy corn starch, glutinous rice starch, wheat starch, etc. As subterranean starches, there may be mentioned sweet potato starch, white potato starch, tapioca starch, etc.

A starch is first made in a homogeneous liquid form. The liquefaction may be effected by (1) a conventional liquefaction process with an acid, (2) a process wherein α-amylase, a product obtained from Bacillus subtilis, is used, (3) a process wherein amylase contained in malt is used, and (4) a process in which starch is stirred under heating for a few minutes at a temperature between 100°–160°C in the absence of an enzyme to obtain a homogeneous liquid. Those processes are selected according to economical conditions, the maltose content of the final product and the starting materials.

If a glucose polymer formed by liquefaction containing glucose in odd numbers is completely decomposed into maltose or disaccharide, in a saccharification process, the formation of glucose or maltotriose cannot be avoided.

Thus, the production rate of maltose from short chained glucose polymer decreases, as a result of the formation of glucose or maltotriose. Accordingly, in order to produce highly pure maltose, the dextrose equivalent (D.E.) of liquefied starch must be lowered as much as possible. In such a case, it is necessary to limit the D.E. within the range of 0.5–5 percent, preferably 1–2 percent, according to the high temperature liquefaction (4) or enzyme liquefaction (2).

If starch syrups have a maltose content of about 50–80 percent, purification treatment after the saccharification is easy and retrogradation of dextrin in the course of the saccharification is not feared at a D.E. in the range of 5–30 percent according to the enzyme liquefaction (2). However, at a D.E. higher than 10, the final maltose content is gradually reduced as D.E. increases.

Available starch concentration is in the range of 10–30 percent. If the concentration is higher than 40 percent, the viscosity becomes high and the treatment becomes troublesome. Particularly, when maximum maltose content is desired, preferably concentration is in the range of 10–20 percent.

As for the difference in the starting starches, the high temperature liquefaction (4) is suitable for subastral starches such as corn starch since it is difficult to gelatinize them completely. The α-amylase method (2) is also applicable sufficiently if an increased quantity of enzyme is used. For such liquefaction of various starch slurries, continuous liquefaction apparatus as in the Examples given below is suitable.

In the saccharification procedure, the above described homogeneously liquefied starch slurry is converted into sugar solution having a high maltose content by the coaction of α-1,6-glucosidase and β-amylase. The first stage of the saccharification depends on the D.E. as described above. Where a saccharification product having maximum maltose content is desired, a sugar solution having a maltose content of 90–95 percent can be obtained by completely reacting α-1,6-glucosidase and β-amylase on a liquefaction product of D.E. 1–2. One trouble is that if starch liquefied homogeneously at a high temperature is cooled to around 50°C, the viscosity thereof increases greatly and retrogradation proceeds as time elapses against the action of the enzymes.

Thus it is necessary to quickly cool a high temperature liquefied product and quickly to incorporate enzymes therein to lower the viscosity prior to the occurrence of retrogradation to carry out the decomposition thereby reducing the viscosity and preventing the retrogradation. One of those methods comprises spraying the liquefied product in vacuum to cool it to a predetermined temperature and at the same time spraying enzyme solutions in a cooler at a certain speed. The mixed, liquefied solution is rapidly reduced in viscosity and the retrogradation is made slow. If the mixed solution is sent into a mixing tank to hold and blend the solution for longer than one hour as shown in the Examples given below, the reaction solution obtained is free from retrogradation. This reaction solution is introduced into a saccharification tank, in which the saccharification is carried out at an optimum pH and at an optimum temperature until the saccharification is completed.

A more preferable method comprises cooling a high temperature liquefied solution to a relatively high temperature of 50°–65°C, adding therein an enzyme obtained from a particularly heat resistant strain of Lactobacillus or ray fungus or highly heat resistant β-amylase, blending the mixture in a blending tank to decompose the same and thereby reducing the viscosity, lowering the temperature in a second blending tank and introducing an enzyme of low heat resistance in the mixture. In case heat resistant α-glucosidases are used, both may be introduced at first at a high temperature or they may be used separately in two different stages each at a controlled pH and temperature. According to the heat resistance of the α-1,6-glucosidase to be used, it is introduced in the first or the second stage.

The process can be performed by quick cooling and instantaneous blending of both enzymes and liquefied starch solution. An easier method comprises cooling a high temperature liquefied solution to around 60°C at which temperature the prevention of retrogradation is possible, introducing one or both enzymes to effect partial decomposition, cooling the mixture during or after lowering the viscosity and introducing the other enzyme to perform the reaction at an optimum pH and at an optimum temperature.

Each α-1,6-glucosidase has some specific action on starches. In particular, an enzyme produced from Pseudomonas is somewhat different from enzymes produced from other strains. Therefore, if the former enzyme is used in combination with one of the latter enzymes, a great effect on β-amylolysis is obtained. Also the similar or more preferable effects may be obtained by using β-amylose in combination with two or more α-1,6-glucosidases. In this case, any α-1,6-glucosidase selected from more than ten enzymes can be used.

An extremely small amount of dextrin sometimes remains in the final product due to too low D.E. in the liquefaction, failure in operation or a defect in the apparatus, and the dextrin thus remaining can be removed completely and the purification procedure can be facilitated to yield favorable products by adding a small amount of α-amylase (for example, less than 5 units) in the middle of the reaction stage or by adding α-amylase at the end of the saccharification at an elevated temperature of 70°–80°C.

If a maltose content of about 50–60 percent is desired, no trouble arises in the cooling and saccharification stages, since D.E. in the liquefaction can be made higher than 5. Thus, if α-amylase or a heat resistant α-1,6-glucosidase, or both of them, are reacted at a temperature of about 60°C as above described, and the mixture is then cooled and mixed with α-1,6-glucosidase, β-amylase or both of them, the reaction can be directly completed.

It is also possible to effect saccharification in the presence of a combination of various enzymes at a temperature below 50°C.

This is applicable mainly to the preparation of sugar solutions of a low maltose content, since contents of glucose and maltotriose are between 10–20 percent even if an enzyme produced from polymixa as β-amylase causes the lowest D.E. in the liquefaction due to its specificity.

Quantity of enzyme to be added and reaction time of course vary according to purposes. For instance, if maltose of a high purity is necessary, it is preferable to introduce 20 units of α-1,6-glucosidase and 20 units of β-amylase per gram of starch. The reaction time in this case is 30–45 hours. In case a saccharose of a low maltose content is desired, the quantity of β-amylase may be reduced to 1–10 units, and reaction time preferable from an industrial viewpoint is 30–40 hours.

From a sugar solution obtained according to the saccharification process of the present invention, a colorless transparent sugar solution is obtained by heating the same to inactivate or flocculate the enzymes and then purifying the same with active carbon or an ion exchange resin. By concentrating the solution to 50 percent concentration, non-crystallizable solution is obtained. If sugar solutions thus obtained are used as raw material for confectionery, their features are fully utilizable even if at a high concentration such as no crystal formation, mild sweetness, no irritation as common sugar, non-hygroscopicity and stability.

By spray-drying the sugar solution thus obtained, after concentration to 50–70 percent, almost anhydrous powder is obtained. By solidifying by way of crystallization and thereafter pulverizing a sugar solution having a water content of 10–15 percent in a suitable manner, hydrous crystalline powder of maltose is obtained. By crystallizing maltose hydrate from highly pure maltose solution of about 70 percent concentration, followed by drying by means of spraying, fine powder of hydrous crystal is obtained, which is useful in a wide range in the form of solid or liquid.

Thus, the object of the present invention is to provide a process for preparing on an industrial basis saccharoses having any desired maltose content of greater than 50 percent in the form of syrup, hydrous crystal or anhydrous powder. A further object of the present invention is to provide a process for preparing maltose of a high purity having mild sweetness, low hygroscopicity and high chemical stability which is usable as raw material in confectionery or the chemical industry. The present invention is very valuable from an industrial viewpoint.

The process of the present invention will be illustrated hereafter in detail by way of a non-limiting example.

The drawing diagrammatically illustrates an embodiment of apparatus used to accomplish the process of the present invention.

EXAMPLE

A continuous reaction apparatus as shown in the drawing is used for the gelatinization and saccharification of starch slurries. (1) is a tank into which starch slurries are fed, in which the concentration, pH and amount of $\alpha$-amylase to be added are controlled. The starch slurry is pumped into a saccharification vessel (2). The saccharification vessel (2) is provided with multiwing stirrer. During vigorous stirring with the stirrer, steam is introduced and the slurry is heated to a predetermined temperature to be gelatinized quickly. A plurality of residence cans (3), more than 10 but less than 20, are provided which are kept at a constant temperature by a jacket, and in which liquefaction is effected until an optimum decomposition rate is obtained. The liquefied solution is sprayed in a flash cooler (4) through a reducing valve and cooled to a desired temperature. The liquefied solution is taken out with a pump and poured into a first blending tank (6). A first enzyme is sprayed from the top of a vacuum flash cooler (5) or directly and continuously poured into the first blending tank (6). In case $\beta$-amylase and $\alpha$-1,6-glucosidase are introduced at the same time, the mixed liquefield solution is held in a saccharification tank (8) to complete the saccharification. If the saccharification is performed in two stages different from each other in temperature, mixture of enzyme and gelatinized solution is mixed under stirring in the first blending tank (6) for a predetermined time and thereafter the mixture is continuously taken out from the bottom into a mixture residence tank (7), to which a second enzyme is poured continuously to hold the enzyme therein for a predetermined temperature and then sent into the saccharification tank (8). Mixing of enzymes and temperature control in the first mixing tank and the mixture residence tank (7) are effected by a strong stirrer and thermoregulator, respectively. Control of pH and temperature is effected separately in each tank.

The liquefying enzyme ($\alpha$-amylase) used is $\alpha$-amylase from Bacillus subtilis (a commercial product of Nagase-Sangyo K.K., Neospitase), and $\beta$-amylase used was one extracted from wheat bran (British Patent No. 1,130,398) or Bacillus polymixa ATCC 8523. As $\alpha$-1,6-glucosidase, there are used Pseudomonas amyloderamosa ATCC 21262 and Escherichia intermedia ATCC 21073. Ray fungi used are Streptomyces diastatochromogenes IFO 3337, Actinomyces globisporus IFO 12208, Nocardia asteroides IFO 3384, Micromonospora melanosporea IFO 12515 and Thermomonospora viridis IFO 12207. Other strains are Agrobacterium tumefaciens IFO 3058, Azotobacter indicus IFO 3744, Bacillus cereus IFO 3001, Erwinia aroideae IFO 3057, Lactobacillus plantarum ATCC 8008, Leuconostoc mesenteroides IFO 3426, Mycobacterium phlei IFO 3158, Micrococcus lysodeikticus IFO 3333, Pediococcus acidilactici IFO 3884, Sarcina lutea IFO 3232, Serratia indica IFO 3759, Staphylococcus aureus IFO 3061 and Streptococcus faecalis IFO 3128.

The determination of enzyme activity of $\alpha$-amylase is effected in the following manner. In several test tubes, 10 g of white potato starch, 1.0 ml of 1/10 mol acetate buffer and 8.0 ml of water are placed, to each of which is then added 1.0 ml of $\alpha$-amylase of different concentrations. The test tubes are agitated in water vigorously, kept at 65°C for 15 minutes after the gelatinization of the starch and then kept again in boiling water for 10 minutes to inactivate the enzyme. The test tubes are cooled in water of 17°C for three minutes, and 0.1 percent Fuchsine solution (1 ml) is added. The mouth of each test tube is closed and the tubes are rotated five times. Among the test tubes containing uniformly colored solution, the activity of enzyme solution of the lowest thickness if arranged to be one unit.

Activity of $\beta$-amylase is determined in the following manner. Five millimeter of 1 percent soluble starch, 4 ml of 0.1 mol acetate buffer and 1 ml of $\beta$-amylase solution are mixed and reacted together at 40°C for 30 minutes and the resulting reducing sugar is determined as maltose. Activity of the enzyme solution for 10 mg maltose is arranged to be one unit.

Activity of $\alpha$-1,6-glucosidase is determined in the following manner. One milliliter of enzyme solution, 5 ml of 1 percent soluble glutinous rice starch solution and 1 ml of 0.5 mol acetate buffer (pH 6.0) are mixed and reacted together at 40°C for 30 minutes, then 0.5 ml of the reaction solution is poured into a mixture of 0.5 ml of 0.01 mol iodine-potassium iodide solution and 15 ml of 0.01 N sulfuric acid solution to yield a bluish purple color. After 15 minutes, absorbancy is determined at wave length of 620 m$\mu$ and the difference in absorbancy from the start of the reaction is calculated. Activity of the enzyme solution yielding the difference of 0.01 is arranged to be one unit.

PREPARATION OF ENZYME SOLUTION

1. Enzyme obtained from Escherichia intermedia ATCC 21073 (one platinum wire loop) is inoculated in 100 ml of medium containing 0.5 percent of maltose, 0.8 percent of peptone and 0.5 percent of sodium nitrate in 500 ml Sakaguchi's flask. After shaking culture at 125 rpm at 30°C for 48 hours, $\alpha$-1,6-glucosidase activity in the culture solution becomes the highest. At this moment, the bacillus cell is removed by centrifugation to obtain the enzyme solution.

In the purification of the enzyme from the above isoamylase-containing solution, the fractions which precipitate between 15 percent and 48 percent ammonium sulfate are taken out. The dehydrated and dried enzyme is used in the form of solution of a predetermined concentration according to quantities to be used at optimum pH of 5.5–6.0 and optimum temperature of 45°C.

2. Alpha-1,6-glucosidase obtained from Pseudomonas amyloderamosa SB-15 ATCC 21262 is inoculated in sterilized medium of pH 7 containing 2 percent of maltose, 0.2 percent of sodium glutamate, 0.3 percent of $(NH_4)_2HPO_4$, 0.1% of $KH_2PO_4$ and 0.05 percent of $MgSO_4 \cdot 7H_2O$ and then subjected to shaking culture at 30°C for 120 hours. After the culture, the determination of enzyme activity reveals 180–220 units/ml in the culture liquid. After centrifugation at 10,000 rpm for 10 minutes to remove the microorganism, the supernatant liquid is obtained.

The liquid is added with cold acetone to the concentration of 75 percent under cooling and stirring to precipitate the enzyme. The enzyme is collected by centrifugation, and freeze-dried under vacuum to obtain powdery α-1,6-glucosidase. Yield: 80–90 percent. The product thus obtained is stable under dry conditions. The product can be purified by salting out with ammonium sulfate, etc. Optimum pH is 3 and the product is stable in the pH range of 3–6. Working temperature is in the range of 40°–50°C.

3. Lactobacillus plantarum ATCC 8008 is inoculated in 7 ml of sterilized medium containing 1 percent of peptone, 0.5 percent of yeast extract, 0.1 percent of $K_2HPO_4$, 0.05 percent of NaCl, 0.05 percent of $MgSO_4 \cdot 7H_2O$, 0.001 percent of $FeSO_4 \cdot 7H_2O$, 0.0002 percent of $MnSO_4 \cdot 4H_2O$, 0.7 percent of liquefied starch and 0.5 percent of maltose, and cultured at 30°C for one day, and then transferred into 10 ml medium and cultured at 30°C for two days. At the completion of the culture, pH is 4.0, exoactivity is 16 and endoactivity is 17, the total being 33 units/ml.

Micrococcus lysodeikticus IFO 3333 (one platinum wire loop) from fresh slant culture medium is inoculated in each of four media of pH 7.0 containing 1 percent of maltose, 0.5 percent of peptone, 0.25 percent of yeast extract, 0.2 percent of urea, 0.2 percent of meat extract, 0.1 percent of $K_2HPO_4$, 0.45 percent of KCl and 0.05 percent of $MgSO_4 \cdot 7H_2O$, and cultured for one day. Four samples thus obtained are then transferred into a 20 liter jar and subjected to aerated culture at 30°C for three days. The final pH is 8.2, exoactivity is 12 and endoactivity is 39, the total being 51 units/ml.

Optimum pH is 5–6.5 for Lactobacillus and around 6–7 for Micrococcus. Optimum temperature is around 45°C for Micrococcus and around 50°–60°C for Lactobacillus. They are heat resistant as compared with other enzymes.

4. Streptomyces, Actinomyces, Nocardia, Micromonospora and Thermomonospora are each inoculated in the quantity of one platinum wire loop in culture medium of pH 7.0 containing 1 percent of liquefied starch, 0.5 percent of peptone, 0.5 percent of meat extract and 0.5 percent of salt after sterilization at 120°C for 20 minutes, and then subjected to shaking culture in a 1,000 ml flask at 30°C for four days.

Each enzyme liquid is salted out with ammonium sulfate at 0.4–0.6 saturation, treated with 0.02 N acetate buffer at pH 7.0, absorbed with DEAE-cellulose and eluted with 0.02 N acetate buffer + 0.5 N NaCl solution to effect partial purification.

Optimum pH is in the range of 5.0–7.0, optimum temperature is 50°–60°C. They have good heat stabilities as compared with other enzymes.

5. Eleven enzyme-producing strains other than the above, i.e., Agrobacterium, Azotobacter, Bacillus, Erwinia, Leuconostoc, Mycobacterium, Pediococcus, Sarcina, Serratia, Staphylococcus, and Streptococcus, are each inoculated in sterilized medium in a 1000 ml flask containing 1.0 percent of peptone, 0.5 percent of $MgSO_4$, 0.01 percent of $FeSO_4 \cdot 7H_2O$ and 1.5 percent of liquefied starch and subjected to shaking culture for four days. The microbe is separated by centrifugation, suspended in buffer containing 0.1 percent of SDS and agitated by means of rotation at 30°C for two days. The supernatant solution is taken out. From the culture liquid is also taken out the supernatant solution. Purification is effected by salting out with ammonium sulfate at 0.8 saturation, dissolving the precipitate in water, dialyzing the solution for 24 hours and subjecting the product to centrifugation to obtain the supernatant liquid as the enzyme solution. Optimum pH is in the range of about 5–7 and optimum temperature is in the range of 45°–50°C.

6. Bacillus polymixa ATCC 8623, a β-enzyme, is inoculated in a medium in a 1,000 ml flask containing 2 percent of soluble starch, 0.5 percent of $NH_4Cl$, 0.1 percent of yeast extract, 0.055 percent of $K_2HPO_4$, 0.014 percent of $NaHPO_4$, 0.025 percent of $MgSO_4$ and 0.5 percent of $CaCO_3$ which has been sterilized. Shaking culture is effected at 30°C for four days. Ten minutes after the centrifugation of the culture liquid, the microbe is suspended in mixture of 2 ml of acetate buffer of pH 6.0 and 3 ml of water. Twenty minutes after the ultrasonic treatment, the microbe is subjected to the centrifugation and the resulting supernatant liquid is used as the enzyme solution.

QUANTITATIVE ANALYSIS OF SUGAR COMPOSITION

After purification with active carbon or an ion exchange resin, decomposed starch solution is subjected to paper chromatography. Each spot of paper-chromatogram is extracted with water, hydrolyzed and determined by Somogyi's method. Each component is expressed by percent based on the total sugars detected.

Degrees of decomposition of liquefied solution and of saccharified solution are represented by rate (%) against the total sugar after decomposition of reducing sugar with hydrochloric acid x 0.9.

LIQUEFACTION OR GELATINIZATION OF STARCH

Starches used as raw materials are corn starch, waxy corn starch and sweet potato starch as representative subastral and subterranean starches. Gelatinization and liquefaction of starch are important since they control maltose content of saccharified starch. Three appropriate methods of gelatinization and liquefaction of starch are shown below.

1. HIGH TEMPERATURE GELATINIZATION METHOD

This method comprises heating starch slurry quickly with stirring in the apparatus shown in the drawing at a temperature of 100°–170°C to obtain homogeneous liquid. Starch slurry adjusted to pH 5–6 is transferred into a starch liquefier (2) by a pump. While steam is introduced at the bottom of the liquefier (2), the liquid is heated with stirring to effect liquefaction homogeneously. The D.E. (Dextrose equivalent) of starch becomes 0.5–5 during heating for 10–30 minutes. The liquefied solution thus obtained having a low viscosity is in a completely and homogeneously dispersed state, and the degree of polymerization of the molecules is high. Therefore, the method is suitable for the preparation of a product of high maltose content.

If the pH of the starch slurry is adjusted to 3.5–4 in this method, the decomposition of starch is facilitated to yield D.E. 5 or higher, but this is unsuitable for the preparation of a product of high maltose content.

2. LIQUEFACTION WITH ENZYME

Liquefaction of starch with α-amylase is effected by using 0.2–0.5 percent of commercially available α-amylase product from Bacillus subtillis (a product of Nagase Sangyo K.K., Neospitase) based on starch in the same manner as in the preparation of glucose or malto syrup. More particularly, a suitable quality of α-amylase is added into the starch slurry and the pH is adjusted to 6.0. The slurry is added into the starch liquefier (2) at a temperature of 80°–90°C. Holding time is 1.5–2 minutes. The liquid is treated to obtain D.E. 0.5–2. If D.E. of 5–35 is desired, the number of holding tanks (3) is increased and the temperature is adjusted to 80°C. After the completion of the liquefaction, the treated liquid is heated with steam in the final residence tank to 120°–125°C to inactivate the enzyme, which is then introduced into a cooler.

According to the above method, any concentration of starch below 40 percent is available and decomposition and liquefaction are performed homogeneously. According to the treatment proposed in the second saccharification stage, concentrations of liquefied solutions are varied. If hydrolyzate having maltose content of about 50–80 is desired, a liquefied solution of a high concentration of 20–35 percent is suitable, and in case the highest maltose content is desired, a concentration of 10–20 percent is suitable.

As for D.E. in the liquefaction of starch, in case a maltose content of about 50–80 percent is desired, D.E. is controlled to 5–30 percent, and in case a high maltose content of higher than 80 percent is desired, D.E. is controlled to 0.5–3. Those conditions influence the results of the saccharification, and reference will be given below in detail. As for the differences according to starches, it is to be noted that high temperature liquefaction is suitable for corn starch since it is difficulty gelatinized, and a 50 percent increase of enzyme is necessary for the liquefaction. Sweet potato starch is easily liquefied, and any method is applicable.

SACCHARIFICATION OF LIQUEFIED STARCH SOLUTION

EXAMPLE 1

Into 10 percent sweet potato starch slurry, 0.2 percent of α-amylase is added and the slurry is liquefied at pH 6.0 at 90°C until D.E. 2.7, into which are added 2.5 units, per gram of starch, of β-amylase obtained from wheat bran and saccharification is carried out at 55°C for 16 hours (A).

Separately, 10 units of α-1,6-glucosidase obtained from Lactobacillus together with 25 units of β-amylase are used and the saccharification is carried out in the same manner (B). Comparing the above case (A) with the case (B), it is noted that maltose content when using β-amylase alone is 69.6 percent, while maltose content when using α-1,6-glucosidase together with β-amylase is 90 percent (refer to Table 1).

TABLE 1

| Case | Maltose (%) | Glucose (%) | Maltotriose (%) | Dextrin (%) |
|---|---|---|---|---|
| A | 69.6 | 1.1 | 3.5 | 25.7 |
| B | 90.4 | 0.4 | 1.3 | 7.9 |

The above results prove that enzyme solutions obtained from the above-mentioned 18 strains having α-1,6-glucosidase activity can react under the same conditions to yield nearly the same results (difference among them in maltose content is only 1–2 percent), except that the enzyme produced from Pseudomonas seems to have somewhat different properties, its reaction velocity when used alone being somewhat low and the optimum pH thereof being low.

EXAMPLE 2

A starch slurry of a concentration of 10–25 percent is liquefied in the same manner as in Example 1, to which are then added 20 units of α-1,6-glucosidase and 10 units of β-amylase. After saccharification at 45°C for 10 hours, the following results are obtained. Appropriate liquefaction rate is about 10 percent, and an indication is observed that the maltose content decreases as the concentration increases.

TABLE 2

| Concentration of Starch (%) | D.E. | Sugar Component | | | |
|---|---|---|---|---|---|
| | | Glucose | Maltose | Maltotriose | Dextrin |
| 10 | 56.8 | 0.2 | 78.1 | 7.9 | 13.8 |
| 15 | 55.5 | 0.2 | 78.0 | 7.9 | 13.9 |
| 20 | 54.1 | 0.3 | 75.0 | 8.0 | 16.7 |

EXAMPLE 3

Relation between liquefaction rate of starch and quality of maltose formed is determined as follows. Into 10 percent starch solution, 0.3 percent of α-amylase product is added. After liquefaction at pH 6.0 at 85°C in the same apparatus as in Example 1, residence time is increased. After liquefaction at 75°C, the solution is quickly cooled to 50°C, to which are then added 20 units of enzyme from Lactobacillus and 15 units of β-amylase at the same time. The whole is stirred and saccharified at pH 6.0, at 45°C for 30 hours. The results are shown in Table 3. Maltose content increases and high molecular sugar and dextrin decrease as liquefaction rate decreases. As liquefaction rate increases, maltose percent decreases, triose percent increases and high molecular fraction decreases.

TABLE 3

| Liquefaction Rate of Starch D.E. | Final D.E. | Sugar Component | | | |
|---|---|---|---|---|---|
| | | Glucose | Maltose | Maltotriose | Dextrin |
| 2.5 | 49.9 | 0.3 | 83.5 | 6.7 | 9.5 |
| 10.8 | 53.3 | 0.8 | 74.8 | 12.5 | 11.9 |
| 19.5 | 55.8 | 1.0 | 67.7 | 22.3 | 9.0 |
| 30.1 | 58.5 | 1.3 | 65.1 | 25.0 | 8.6 |

EXAMPLE 4

Relation between quantity of enzyme and maltose is determined using 10 percent liquefied starch solution of D.E. 2 obtained in Example 1 at pH 6.0, at temperature of 45°C for reaction time of 30 hours. The results are as shown in the following table.

TABLE 4

| $\alpha$-1,6-glucosidase Unit/g Starch | $\beta$-amylase Unit/g Starch | Sugar Component | | |
|---|---|---|---|---|
| | | Glucose | Maltose | Maltotriose |
| 10 | 30 | 0.5 | 86.1 | 6.5 |
| 20 | 30 | 0.8 | 87.8 | 6.2 |
| 200 | 30 | 1.1 | 82.0 | 12.4 |
| 0 | 30 | 1.2 | 69.2 | 3.8 |

Alpha-1,6-glucosidase in an activity of 10–20 units reveals a sufficient effect.

TABLE 5

| $\beta$-amylase Unit/g Starch | Reaction Time | Final D.E. | Sugar Component | | | |
|---|---|---|---|---|---|---|
| | | | Glucose | Maltose | Maltotriose | Dextrin |
| 20 | 24 | 58.5 | 1.1 | 83.5 | 11.0 | 4.4 |
| 20 | 48 | 60.1 | 1.2 | 83.1 | 13.1 | 2.6 |
| 60 | 24 | 60.3 | 2.0 | 86.5 | 8.4 | 3.1 |
| 60 | 48 | 61.5 | 2.1 | 88.3 | 7.5 | 2.1 |

Activity of $\alpha$-1,6-glucosidase is 20 units.

As shown in the above table, the reaction proceeds sufficiently at 62-amylase strength of 20 units. In particular, in case a highly pure maltose is desired, an increase in the amount of $\beta$-amylase is somewhat efficient.

EXAMPLE 5

Preparation of decomposition product of starch having the highest maltose content:

For obtaining the highest maltose content of around 90 percent, D.E. in the liquefaction must be as low as possible. Therefore, the reaction is carried out at D.E. 0.5–5, preferably 1–12. Consequently, the viscosity becomes very high, and the difficulty in mixing of enzyme under cooling and residence of non-reacted one due to retrogradation are feared. Accordingly, the cooling and mixing of enzyme are performed in 2–3 steps in the above-described apparatus. Liquefied solution is sprayed in vacuum to cool it instantaneously. Then cooling and mixing of enzyme are performed instantaneously. For caution's sake, the cooling is stopped at a temperature of 50°–60°C, and first preliminary saccharification is performed with an enzyme obtained from Lactobacillus or streptomyces, or $\beta$-amylase having high heat resistance. During several hours of residence time, the viscosity is lowered and fear of retrogradation is reduced. Thereafter, the mixture is introduced into a second preliminary saccharification tank (second mixing tank), in which is then added $\alpha$-1,6-glucosidase or $\beta$-amylase. In both cases, it is introduced into a large quantity of highly saccharified sugar solution, and therefore, the low-sugar solution is diluted and contacted with the fresh enzyme to prevent again.

Temperature in the first step is kept as high as possible, and in the second step is lowered to working temperature. In the last saccharification tank, the saccharification is performed at an optimum temperature for two days in batch system. The reaction tank and the stirring and mixing tank are kept from entering of other germs, since the saccharification is performed at a relatively low temperature of 45°–50°C. Starches used as raw material are corn starch, waxy corn starch and sweet potato starch. As $\alpha$-1,6-glucosidase, all of the above-mentioned enzymes are tested. Enzyme from Pseudomonas having different activity from that of the other enzymes is tested on the effect also in the form of mixture with another enzyme.

TABLE 6

| Run No. | I | II | III | IV | V | VI | VII | VIII |
|---|---|---|---|---|---|---|---|---|
| Kind of Starch | Corn Starch | Waxy Corn Starch | Corn Starch | Sweet Potato Starch | Sweet Potato Starch | Sweet Potato Starch | Potato Starch | Corn Starch |
| Temperature of liquefaction (°C) | 150–160 | 150–160 | 150–160 | 150–160 | 88–95 | 88–95 | 88–95 | 88–95 |

TABLE 6—Continued

| Run No. | I | II | III | IV | V | VI | VII | VIII |
|---|---|---|---|---|---|---|---|---|
| Kind of Starch | Corn Starch | Waxy Corn Starch | Corn Starch | Sweet Potato Starch | Sweet Potato Starch | Sweet Potato Starch | Potato Starch | Corn Starch |
| Enzyme for Liquefaction u | — | — | — | — | α15 | α15 | α15 | α15 |
| Starch (g) pH | 5.5 | 5.5 | 4.0 | 5.0 | 6.0 | 6.0 | 6.0 | 6.0 |
| Liquefied Solution D.E. | 1.0 | 2.1 | 3.0 | 2.0 | 2.5 | 0.5 | 2.1 | 2.5 |
| Concentration of Liquefied Solution % | 10 | 15 | 20 | 20 | 12 | 15 | 20 | 15 |
| Enzyme of First Preliminary Saccharification u | E20 β20 | β20 | L25 | β25 | E15 P20 | β25 | S25 | β30 |
| Starch (g) pH | 6.0 | 6.0 | 6.0 | 6.0 | 6.0 | 6.0 | 6.0 | 6.0 |
| Temperature °C | 45 | 60 | 60 | 60 | 45 | 60 | 60 | 60 |
| Enzyme for Second Preliminary Saccharification u | — | Ps30 | β20 | Ps20 E10 | — | E20 | β20 | Ps15 L15 |
| Starch (g) pH | — | 5.5 | 6.0 | 5.5 | — | 6.0 | 6.0 | 5.5 |
| Temperature °C | — | 45 | 50 | 45 | — | 45 | 50 | 45 |
| pH in the Saccharification | 6.0 | 5.5 | 6.0 | 5.5 | 6.0 | 6.0 | 6.0 | 5.5 |
| Temperature °C | 45 | 45 | 45 50 | 45 | 45 | 45 | 50 | 45 |
| Time | 48 | 48 | 50 | 45 | 45 | 50 | 45 | 45 |
| Maltose % | 93 | 92 | 90 Finally β5 is added at 80°C | 92.5 | 83 | 92 After completion, β5 is added at 80°C | 92 | 93 After standing for 48 hrs. β5 is added at 80°C |

α: α-amylase
β: β-amylase from wheat bran
Ps: Enzyme from Pseudomonas
E: Enzyme from Escherichia
L: Enzyme from Lactobacillus
S: Enzyme from ray fungus
P: β-amylase from polymixa As shown in the above table, α-1,6-glucosidase is effective even if it is used alone. In a liquefied solution having a high concentration and a low D.E., it is very effective to accelerate the decomposition by adding a highly heat resistant enzyme in two steps. Difficulty is observed in run No. VI, but subsequent purification is facilitated by adding a small quantity of α-amylase at the final stage of the reaction. Use of polymixa enzyme as in the above run No. V limits maltose production and is sometimes unsuitable.

EXAMPLE 6

Preparation of syrup having a relatively low maltose content

In case maltose content of 50–80 percent is desired, no particular caution is necessary in the liquefaction of enzyme. The liquefaction with α-amylase is carried out at D.E. 5–30, one or more α-1,6-glucosidases are added into the liquefied solution of a low viscosity, the order of the addition may be changed freely as in Example 5 and the treatment facilitated.

Purification after completion of the saccharification is very easily performed. In all cases, treatment with α-amylase as the final stage of the reaction is not required.

Some examples are shown in the following table.

TABLE 7

| Run No. | I | II | III | IV | V | VI | VII | VIII |
|---|---|---|---|---|---|---|---|---|
| Kind of starch | Corn starch | Waxy corn starch | Corn starch | Tapioca | Potato starch | Waxy corn starch | Sweet potato starch | Sweet potato starch |
| Temperature of liquefaction(°C) | 150–160 | 150–160 | 130 | 150–160 | 85–90 | 85–90 | 85–90 | 85–90 |
| pH | 5.0 | 5.0 | 3.5 | 5.0 | 6.0 | 6.0 | 6.0 | 6.0 |
| Enzyme for liquefaction u/g starch | — | — | — | — | β15 | β15 | β15 | β15 |
| D.E. of liquefied solution | 3 | 3 | 5 | 2 | 6 | 10 | 20 | 30 |
| Concentration of liquefied solution (%) | 30 | 20 | 25 | 30 | 20 | 30 | 30 | 30 |
| Enzyme for first saccharification u/g starch | α5 β3 | α10 β5 L 15 | α10 S 15 | α10 L 10 | β5 E 15 | β5 | P 20 | E 20 |
| Temperature (°C) | 70 | 55 | 60 | 60 | 45 | 60 | 60 | 60 |
| pH | 6.0 | | 6.0 | 6.0 | 6.0 | 6.0 | 6.0 | 4.5 |
| Enzyme for second saccharification u/g starch | P 20 Ps10 | — | β3 | β3 | — | L10 Ps15 | β5 | P 10 |
| pH | 5.5 | — | 6.0 | 6.0 | — | 5.5 | 6.0 | 6.0 |
| Temperature (°C) | 45 | — | 50 | 50 | — | 45 | 50 | 45 |
| pH | 5.5 | 6.0 | 6.0 | 6.0 | 6.0 | 5.5 | 6.0 | 6.0 |
| Temperature (°C) | 45 | 50 | 50 | 50 | 45 | 45 | 50 | 45 |
| Reaction time | 40 | 30 | 35 | 40 | 40 | 35 | 40 | 45 |
| Sugar Maltose | 72 | 80 | 72 | 76 | 71 | 75 | 68 | 63 |
| Maltotriose | 12 | 10 | 16 | 15 | 14 | 14 | 23 | 27 |

As shown in the above examples, saccharification treatment is easy if D.E. of above 5 is obtained in the liquefaction, but the effect of the enzyme decreases as D.E. increases. Saccharified liquids in the present invention after purification may be in the form of concentrated syrups of non-crystalline sugar and also in the form of anhydrous powder prepared by spray-drying or the like. At a maltose content of around 90 percent, precipitate can be formed at a concentration of 60–70 percent. Slurry may be sprayed to obtain hydrous crystalline powder or less hygroscopic crystalline powder.

EXAMPLE 7

Enzyme obtained from strains other than the above-illustrated, heat resistant Lactobacillus, ray fungi and Pseudomonas are subjected to comparative test in the same manner as in No. 1 in Table 6 or No. V in Table 7 to obtain similar results, only slight difference between them are ± 1 percent in maltose and ± 1.5 percent in maltotriose. Thus, no difference is observed substantially.

It will be obvious to those skilled in the art that various changes may be made without departing from the scope of the invention and the invention is not to be considered limited to what is shown in the drawing and described in the specification.

What is claimed is:

1. A process of producing sugar solutions having greater than 80 percent maltose content comprising the steps of:
   1. liquefying a starch slurry at an elevated temperature to provide a D.E. of 0.5 – 5.0;
   2. instantaneously cooling the liquefied starch to the highest possible temperature which does not substantially inactivate the enzymes used in this step and simultaneously mixing a heat-resistant α-1,6-glucosidase obtained from ray fungi therewith;
   3. completing saccharification by cooling to the optimum temperature and adjusting to the optimum pH for the enzymes used in this step and adding β-amylase for a time sufficient to complete saccharification.

2. A process according to claim 1 wherein said heat resistant α-1,6-glucosidase obtained from ray fungi comprises a mixture of two or more kinds of heat resistant α-1,6-glucosidase obtained from ray fungi, different from each other in their specific action on starches.

3. A process according to claim 1 wherein said heat resistant α-1,6-glucosidase obtained from ray fungi is Streptomyces diastatochromogenes IFO 3337, Actinomyces globisporus IFO 12208, Nocardia asteroides IFO 3384, Micromonospora melanosporea IFO 12515 or Thermomonospora viridis IFO 12207.

4. A process according to claim 1 wherein said step (1) is effected by liquefying at a temperature in the range of 100° – 170°C.

5. A process according to claim 1 wherein said pure β-amylase is highly pure β-amylase extracted from wheat bran.

6. A process according to claim 1 wherein the result-

7. A process according to claim 1 wherein said step (1) is effected by liquefying in the presence of α-amylase at a temperature of 80° – 90°C.

8. A process according to claim 1 wherein said step (2) is carried out at a temperature within the range of 50° – 65°C.

9. A process of producing sugar solutions having greater than 80 percent maltose content comprising the steps of:
  1. liquefying a starch slurry at an elevated temperature to provide a D.E. of 0.5 – 5.0;
  2. instantaneously cooling the liquefied starch to the highest possible temperature which does not substantially inactivate the enzymes used in this step and simultaneously mixing pure β-amylase or a heat resistant α-1,6-glucosidase obtained from ray fungi therewith;
  3. completing saccharification by cooling to the optimum temperature and adjusting to the optimum pH for the enzymes used in this step and adding an α-1,6-glucosidase comprising a mixture of two or more kinds of α-1,6-glucosidase different from each other in their specific action on starches when pure β-amylase is used in step (2) or pure β-amylase when heat resistant α-1,6-glucosidase obtained from ray fungi is used in step (2) for a time sufficient to complete saccharification.

10. A process according to claim 9 wherein said heat resistant α-1,6-glucosidase obtained from ray fungi comprises a mixture of two or more kinds of heat resistant α-1,6-glucosidase obtained from ray fungi, different from each other in their specific action on starches.

11. A process of producing sugar solutions having greater than 80 percent maltose content comprising the steps of:
  1. liquefying a starch slurry at an elevated temperature to provide a D.E. of 0.5 – 5.0;
  2. instantaneously cooling the liquefied starch to the highest possible temperature which does not substantially inactivate the enzymes used in this step and simultaneously mixing pure β-amylase or a heat-resistant α-1,6-glucosidase obtained from ray fungi therewith;
  3. completing saccharification by cooling to the optimum temperature and adjusting to the optimum pH for the enzymes used in this step and adding α-1,6-glucosidase when pure β-amylase is used in step (2) or pure β-amylase when heat resistant α-1,6-glucosidase obtained from ray fungi is used in step (2) for a time sufficient to complete saccharification; and
  4. adding α-amylase to said saccharified solution at the end of said step (3) at a temperature of 70° – 80°C. in order to remove any remaining dextrin.

12. A process according to claim 11 wherein said α-1,6-glucosidase is produced from Pseudomonas amyloderamosa ATCC 21262, Escherichia intermedia ATCC 21073, Agrobacterium tumefaciens IFO 3058, Azotobacter indicus IFO 3744, Bacillus cereus IFO 3001, Erwinia aroideae IFO 3057, Leuconostoc mesenteroides IFO 3426, Mycobacterium phlei IFO 3158, Micrococcus lysodeikticus IFO 3333, Pediococcus acidilactici IFO 3884, Sarcina lutea IFO 3232, Serratia indica IFO 3759, Staphylococcus aureus IFO 3061 or Streptococcus feacalis IFO 3128.

* * * * *

UNITED STATES PATENT OFFICE
CERTIFICATE OF CORRECTION

Patent No. 3,804,715          Dated April 16, 1974

Inventor(s) Kaname SUGIMOTO et al

It is certified that error appears in the above-identified patent and that said Letters Patent are hereby corrected as shown below:

Column 9, line 58, "difficulty" should read --difficultly--

" 11, " 44, "62-amylase" should read --β-amylase--

" 11, " 55, "1-12" should read --1-2--

Col. 15-16, Table 7, columns V, VI, VII, VIII - in each column "β15" should read --α15--

Signed and sealed this 1st day of October 1974.

(SEAL)
Attest:

McCOY M. GIBSON JR.                    C. MARSHALL DANN
Attesting Officer                      Commissioner of Patents